(12) United States Patent
Poon et al.

(10) Patent No.: US 9,871,551 B2
(45) Date of Patent: *Jan. 16, 2018

(54) CUSTOMIZABLE PROTECTIVE CASE FOR PORTABLE ELECTRONIC DEVICE

(71) Applicant: GRIFFIN TECHNOLOGY, LLC, Irvine, CA (US)

(72) Inventors: Daniel Poon, Nashville, TN (US); Evan Reese, Nashville, TN (US); Paul Grote, Old Hickory, TN (US)

(73) Assignee: Griffin Technology, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/448,397

(22) Filed: Mar. 2, 2017

(65) Prior Publication Data

US 2017/0179994 A1 Jun. 22, 2017

Related U.S. Application Data

(63) Continuation of application No. 14/941,391, filed on Nov. 13, 2015, now Pat. No. 9,590,684.

(60) Provisional application No. 62/078,980, filed on Nov. 13, 2014.

(51) Int. Cl.
| | |
|---|---|
| *H04B 1/3888* | (2015.01) |
| *H04M 1/02* | (2006.01) |
| *A45C 13/00* | (2006.01) |
| *H04M 1/04* | (2006.01) |
| *H04M 1/18* | (2006.01) |
| *H04B 1/38* | (2015.01) |

(52) U.S. Cl.
CPC ......... *H04B 1/3888* (2013.01); *A45C 13/002* (2013.01); *H04M 1/0202* (2013.01); *H04M 1/04* (2013.01); *H04M 1/185* (2013.01); *H04B 2001/3894* (2013.01)

(58) Field of Classification Search
CPC .......... H04B 1/3888; H04B 2001/3894; H04B 1/3877; H04B 2001/3855
See application file for complete search history.

(56) References Cited

U.S. PATENT DOCUMENTS

| | | | | |
|---|---|---|---|---|
| 8,505,718 | B2 * | 8/2013 | Griffin, Jr. | A45C 11/00 206/320 |
| 8,676,281 | B1 * | 3/2014 | Caulder | H04M 1/0283 455/575.1 |
| 2010/0230301 | A1 * | 9/2010 | Fellig | H04B 1/3888 206/232 |

(Continued)

*Primary Examiner* — Khalid Shaheed
(74) *Attorney, Agent, or Firm* — Manatt, Phelps & Phillips, LLP

(57) ABSTRACT

A protective case for a portable electronic device includes a rigid plastic frame bonded to a stretchable rubber cover and a back panel insert that can be removably inserted into a pocket in the rear of the stretchable rubber cover and plastic frame. To position a device in the case, the device is simply inserted into the front opening of the rigid plastic frame and stretchable rubber cover such that the edges of the stretchable cover stretch over the device and secure the device in the case. A variety of different removable back panels allow the stand to be easily reconfigured to include a stand for the device case, a pocket adapted to hold payment cards, a folding style wallet, a mirror or a fabric covering.

16 Claims, 8 Drawing Sheets

(56) References Cited

U.S. PATENT DOCUMENTS

2013/0170110 A1\* 7/2013 Lee ..................... F16M 11/041
　　　　　　　　　　　　　　　　　　　361/679.01
2014/0152890 A1\* 6/2014 Rayner ................ G06F 1/1626
　　　　　　　　　　　　　　　　　　　348/376

\* cited by examiner

CUSTOMIZABLE PROTECTIVE CASE FOR PORTABLE ELECTRONIC DEVICE

INCORPORATION BY REFERENCE TO RELATED APPLICATIONS

This application is a continuation of U.S. application Ser. No. 14/941,391, filed Nov. 13, 2015, which claims benefit under 35 U.S.C. §119(e) from U.S. Provisional Application No. 62/078,980, filed on Nov. 13, 2014. All of the above applications are hereby incorporated herein by reference in their entirety and are to be considered a part of this specification.

BACKGROUND OF THE INVENTION

A wide variety of different types and designs of cases for portable electronic devices are known. One problem with existing device cases is that consumers like a variety of different cases and like to change and update their cases and devices often. This means the manufacturers must build and stock a wide variety of different styles and sizes of device cases and consumers are often forced to buy a new case to obtain a new design or functionality even though the old case is still functional. Therefore, what is needed is an advanced customizable case design that can be easily changed into a number of different configurations.

BRIEF SUMMARY OF THE INVENTION

An embodiment of the present invention is directed toward a protective case for a portable electronic device. The protective case includes a rigid plastic frame, a stretchable rubber cover and a back panel that can be removably inserted into a pocket on a rear of the stretchable rubber cover. The stretchable cover is preferably attached to the rigid plastic frame by the manufacturer. To put a device in the case, the device is simply inserted into front opening of the rigid plastic frame and the edges of the stretchable rubber cover stretch over the portable electronic device such that the device is secured in the protective case. The back panel includes a hooked lip and locking tabs positioned around the outer perimeter of the back panel that mate with a corresponding hooked lip and cavities positioned around the inner edges of the pocket in the rear of the case assembly. An assortment of different back panels can be inserted into the pocket in the case assembly to alter the appearance or function of the case. These back panels include a stand for the device case. The stand back panel has a pair sloped edges on a foot of a foldable stand that allow the stand to support the device case in either a horizontal or vertical position. The back panel can also have a payment card pocket adapted to hold payment cards with a protrusion in the pocket that applies pressure to any payment cards placed in the pocket to securely hold them. Another back panel having a folding wallet attached to the panel provides the case with the functionality of a wallet as well as a viewing stand. The back panels can also have a variety of different surfaces and designs such as a mirror or a recess adapted for fabric adhesion.

DETAILED DESCRIPTION OF THE PREFERRED EMBODIMENT

The present invention is directed toward an adaptable protective device case with a removable back panel or insert that can be replaced with an assortment of inserts that have different designs and/or functions. The device case preferably includes a rigid plastic frame bonded to an outer stretchable rubber cover or bumper that fits around the edges of the rigid frame and holds enclosed device. A removable back panel snaps into an opening in the back of the stretchable rubber cover.

The design of the platform allows a user of the case to mix and match different rubber covers and back panels with a standardized rigid frame to create different case designs and functions. A single case can easily be changed into different configurations by simply inserting a different insert into the rear of the main case assembly. For example, the case may include a back panel tooled for fabric adhesion, a back panel of plain plastic in various colors, patterns and designs, a back panel for in mold lamination, a back with a payment card holder, a back with a folding wallet, a back with a kick stand, and a back with a mirror. In addition, the case assembly of the present invention is readily adaptable to different device sizes and styles from various manufacturers. The cases are preferably sold in a kit that includes a rigid plastic frame bonded to a rubber bumper or cover and a matching back panel insert. However, the back panels may also be sold individually or in sets.

Figure 1:
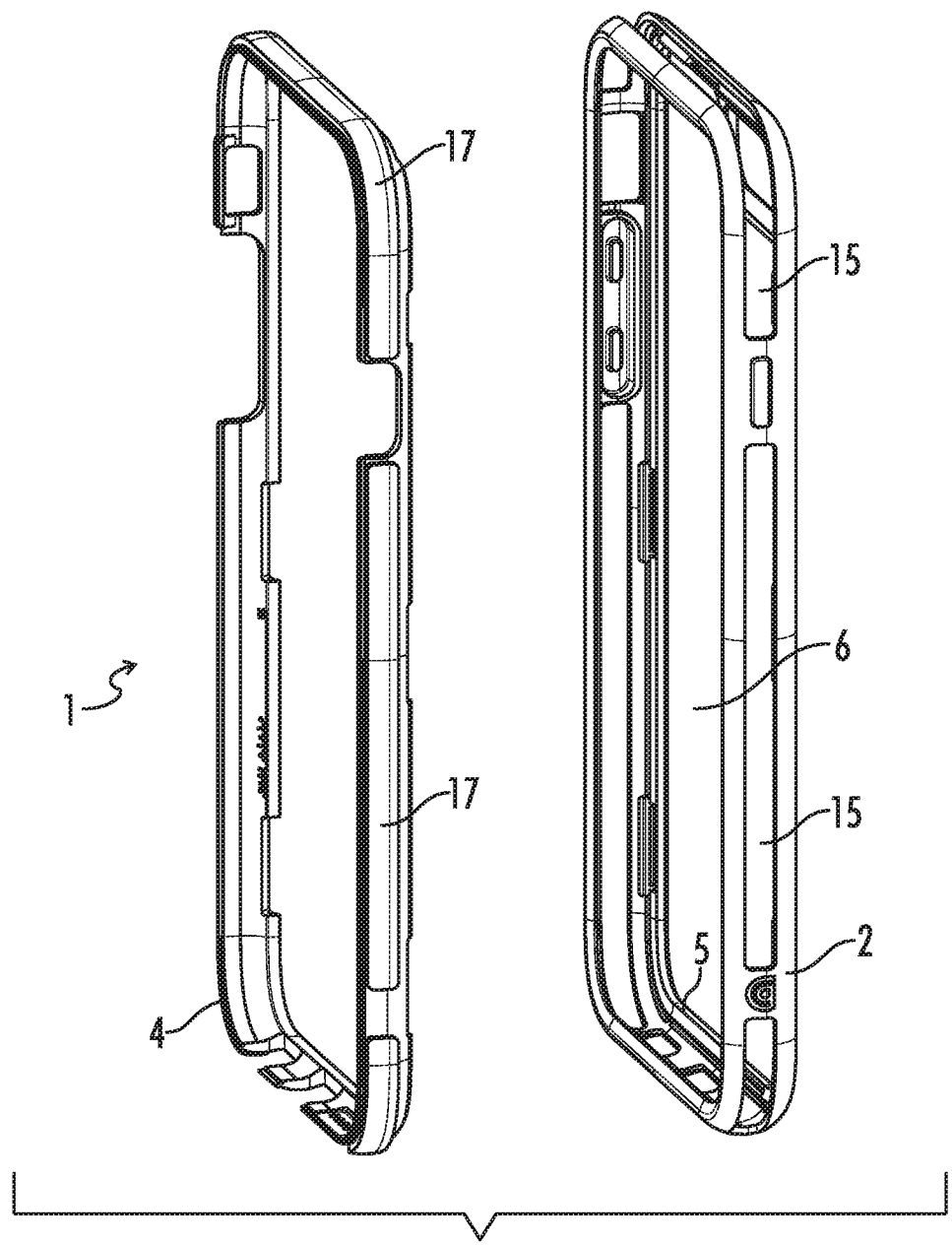
FIG. 1 is a drawing of an unassembled embodiment of the present invention without a back panel inserted into the main protective case assembly.

Referring now to FIG. 1, a drawing of an unassembled embodiment of the present invention without a back panel inserted in the main case assembly is shown. The main case assembly 1 consists of a stretchable rubber cover 2 and a relatively rigid plastic frame 4 that are preferably bonded together during production. To insert a device into the case assembly 1, the device is simply pushed into the opening in the front of the case assembly 1 and the edges of the rubber cover 2 stretch over the device such that the device is securely held inside both the rubber cover 2 and plastic frame 4 of the case assembly. Raised bumpers 17 on the plastic frame extend through corresponding openings 15 in the rubber cover 2.

Figure 2A:
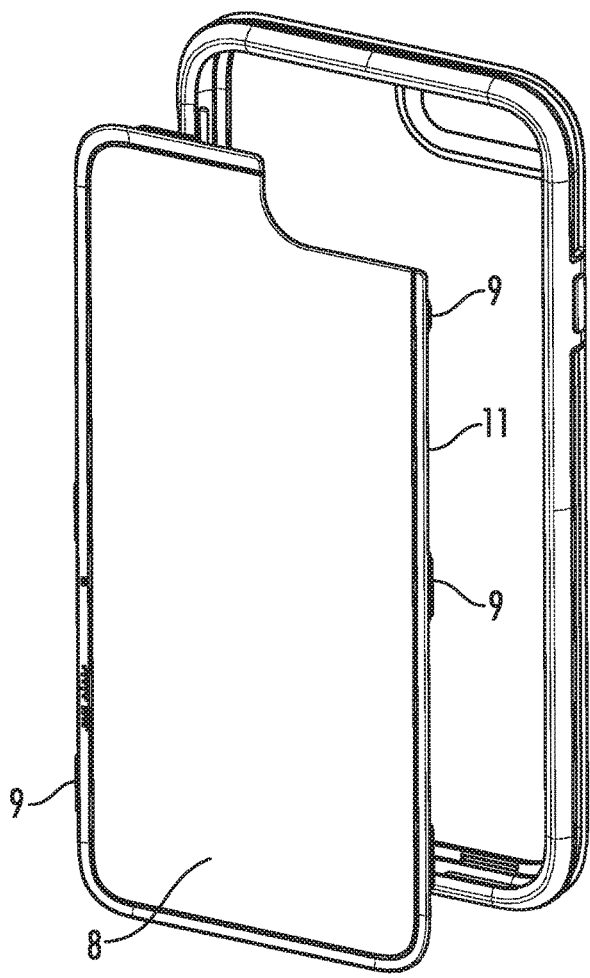
FIGS. 2a-2c are respectively a drawing of a back panel for insertion into the back of the main case assembly, a close up view of the hooked lips on the stretchable rubber cover and back panel, and a close up view of a cavity in the stretchable cover that receives a locking tab.
Figure 2B:
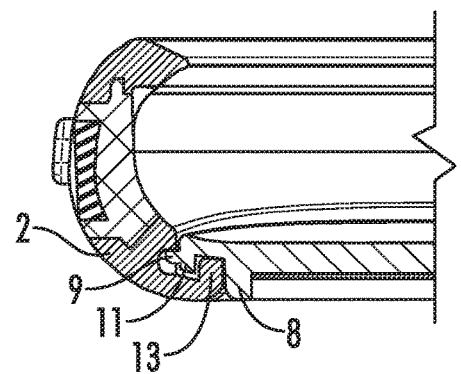
Figure 2C:
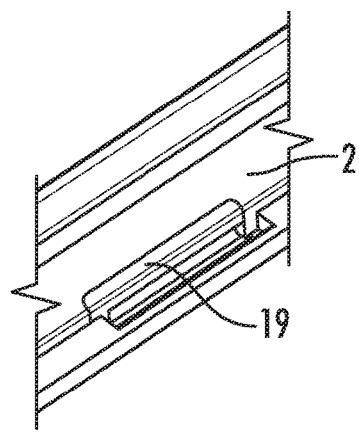

The rubber cover 2 and plastic frame 4 have an opening or pocket 6 in the rear with edges 5 that are adapted to receive and securely hold a matching back panel or insert. FIG. 2(a) is a drawing of a back panel insert 8 that snaps into the back opening in the stretchable rubber cover 2 and plastic frame 4. FIG. 2(b) is close up cross sectional view of the mating of the hooked back panel edge 11 with the hooked edge 13 of the rubber cover 2. The back panels hooked edge or lip 11 is provided with locking tabs 9 that fit into corresponding cavities on the rubber cover 2. The hooked edge 11 of the back panel 8 mates with the corresponding hooked edge 13 on the rubber cover 2 to securely hold the back panel 8 in position with respect to the rubber cover 2. FIG. 2(c) is a drawing of a cavity 19 in the rubber cover 2 that receives a locking tab 9. The locking tab 9 rests in the corresponding cavity 19 on the rubber cover 2 such that the back panel is fixed and prevented from sliding with respect to the rubber cover 2 or plastic frame 4.

Figure 3:
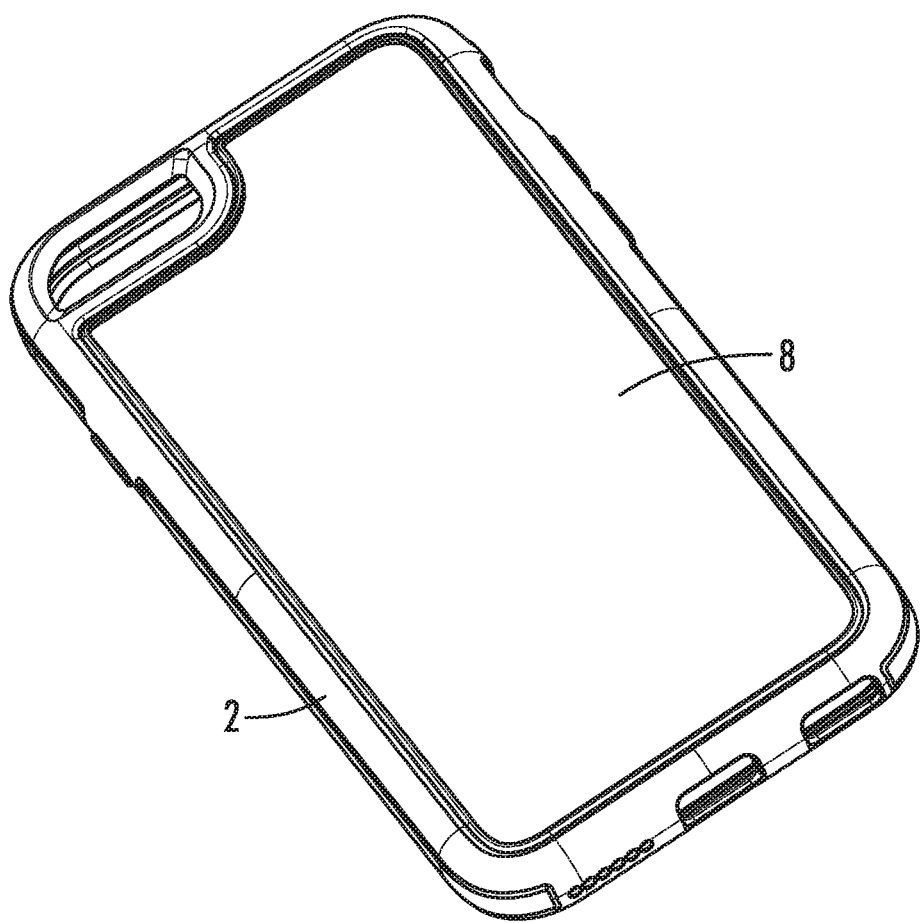
FIG. 3 is a drawing of the embodiment of FIG. 1 with a solid back panel inserted in the back of the main protective case assembly.

Referring now to FIG. 3, a drawing of the embodiment of FIG. 1 with a solid plastic back panel 8 inserted into the pocket 6 on the back of the main case assembly is shown. As discussed in more detail below and above, the edges 8 of the pocket in the back of the rubber bumper 2 and plastic frame 4 have features such as hooked edges that allow them to grip and hold an insert inserted into the back pocket 6. The solid back panel 8 can easily be replaced by simply pulling it off of the rubber cover 2 and replacing it with an alternative back panel having a different design or surface, such as a mirrored surface, to alter the design, appearance or function of the case. The solid back panels 8 can also include a recessed plastic surface and channel that are adapted to receive fabric such that a pleasing fabric or leather back can be provided to the case. In addition, alternative stretchable covers 2 can be provided that have different designs or fabric surfaces, but a standardized back pocket 6 that can receive any available back panel.

Figure 4:
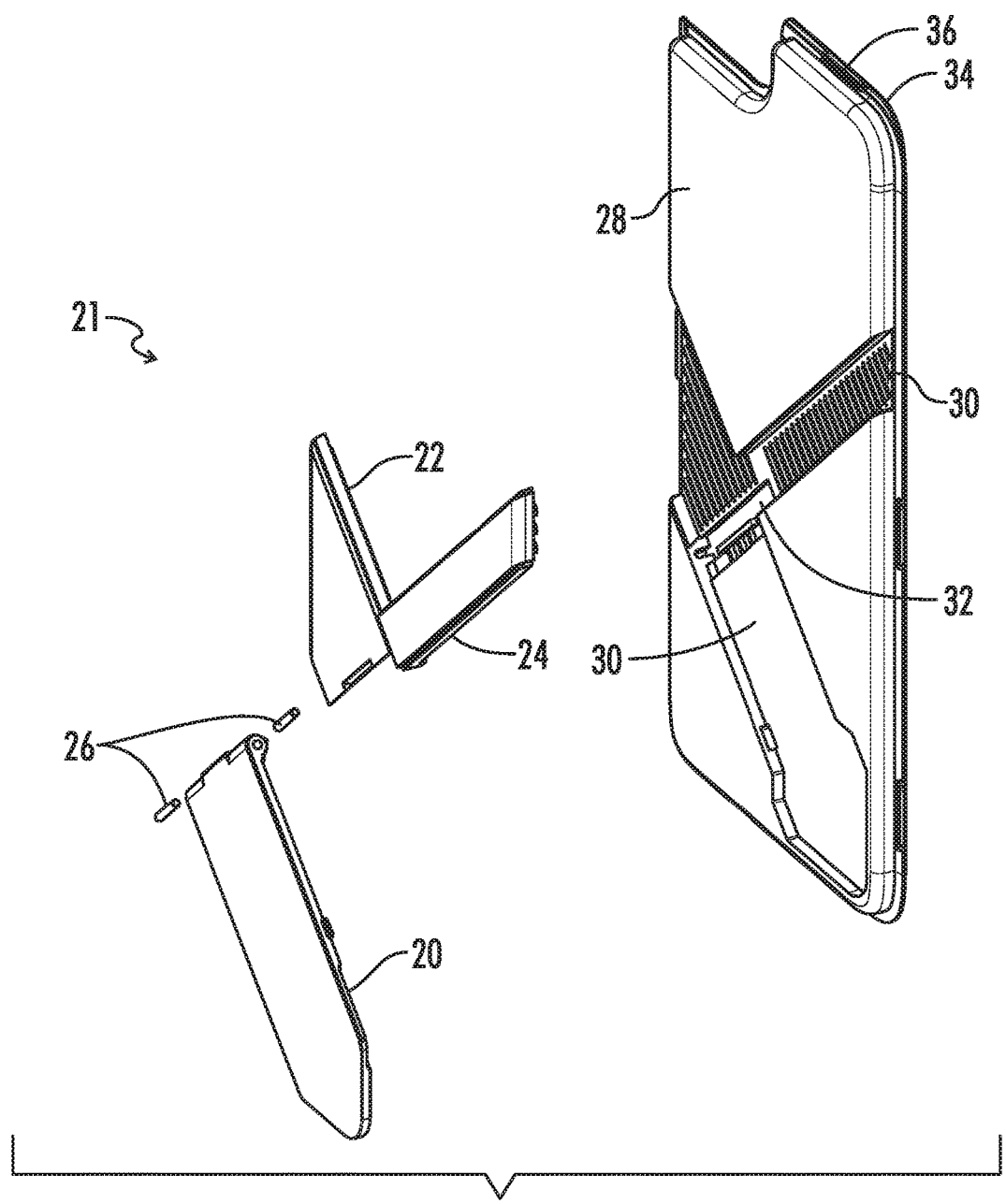
FIG. 4 is a drawing of an unassembled stand back panel insert for use in accordance with an embodiment of the present invention.

Referring now to FIG. 4, a drawing of an unassembled stand back panel insert 21 for an alternative embodiment of the present invention is shown. The stand back panel insert 21 includes three plastic pieces foot 20, mounting member 22 and mounting member 24, two hinge pins 26 and a main back panel 28. The main back panel 28 includes cavities 30 and holes 32 into which the plastic pieces 20, 22 and 24 and hinge pins 26 are inserted when the stand back panel insert is fully assembled. The main back panel 28 includes a hooked lip 34 with protrusions or tabs 36 around its outer perimeter that function together with matching hooked lips and cavities on the inner edges of the opening of the case assembly discussed above with respect to FIG. 1 to securely hold the back panel in the back of the case assembly.

Figure 5:
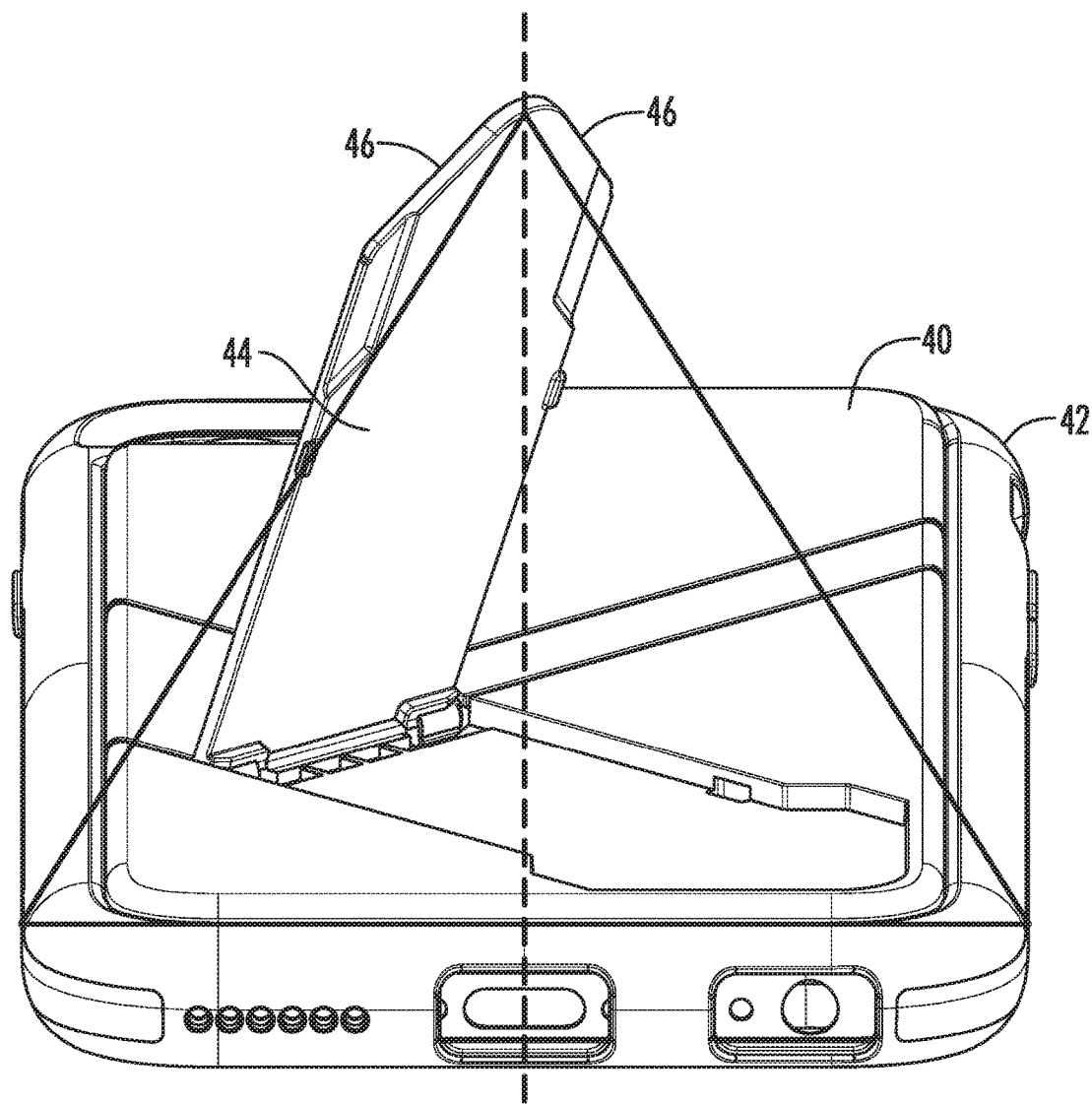
FIG. 5 is a drawing of an embodiment of the present invention with the assembled stand back panel of FIG. 4 inserted into the back of the main protective case assembly and with the stand in the open position.

FIG. 5 is drawing of the assembled stand back panel 40 of FIG. 4 inserted into the case assembly 42 of FIG. 1 with the stand arm 44 in the extended or open position. When the stand is open position, the edges 46 of the stand arm 44 function to hold the case and device in either a horizontal or vertical viewing position depending upon how the case is positioned on the supporting surface.

Figure 6:
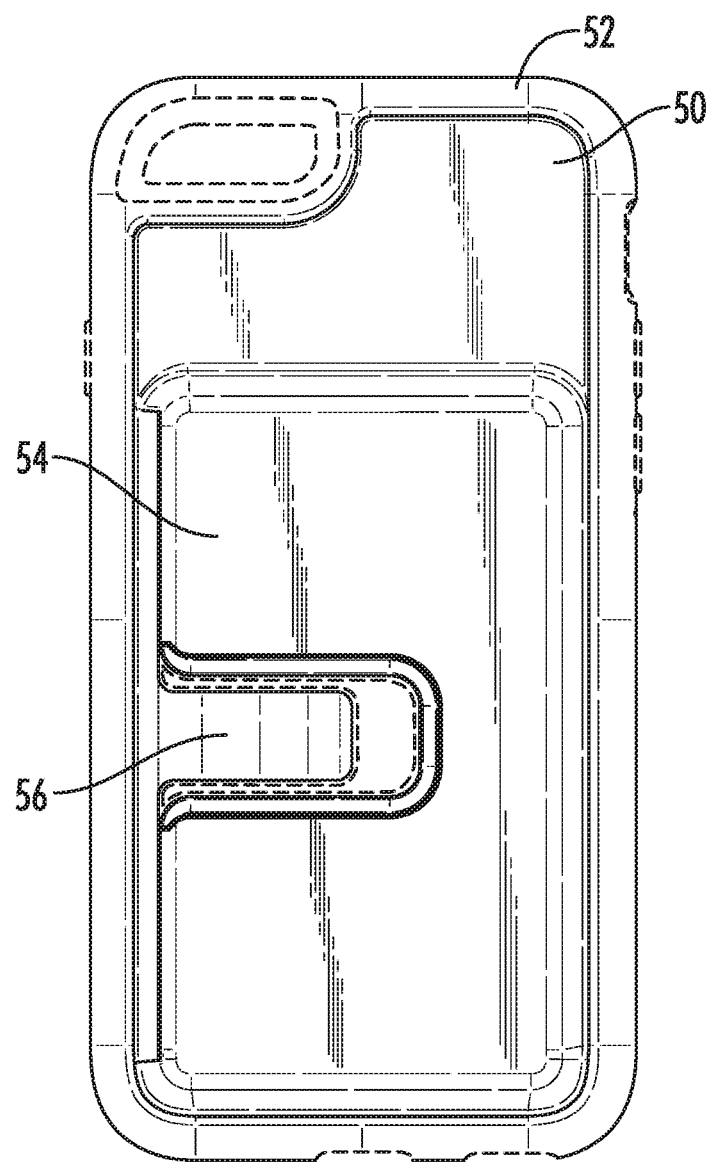
FIG. 6 is a drawing of an embodiment of the present invention with a payment card style back panel inserted into the back of the main case assembly.

Referring now to FIG. 6, a drawing of an embodiment of the present invention with a payment card style back panel insert 50 inserted into the main case assembly 52 is shown. The payment card style back panel insert 50 includes a pocket 54 sized to accept payment cards and/or folded cash. The pocket 52 has a central protrusion 56 that flexes and applies pressure to items held in the pocket 52 so that the items do not fall out of the pocket. Similar features, such as tabs and hooked lips, to those discussed above with respect to the embodiment of FIG. 5 are provided around the edges of the back panel insert 50 to secure it in the rear well of the case assembly 52.

Figure 7:
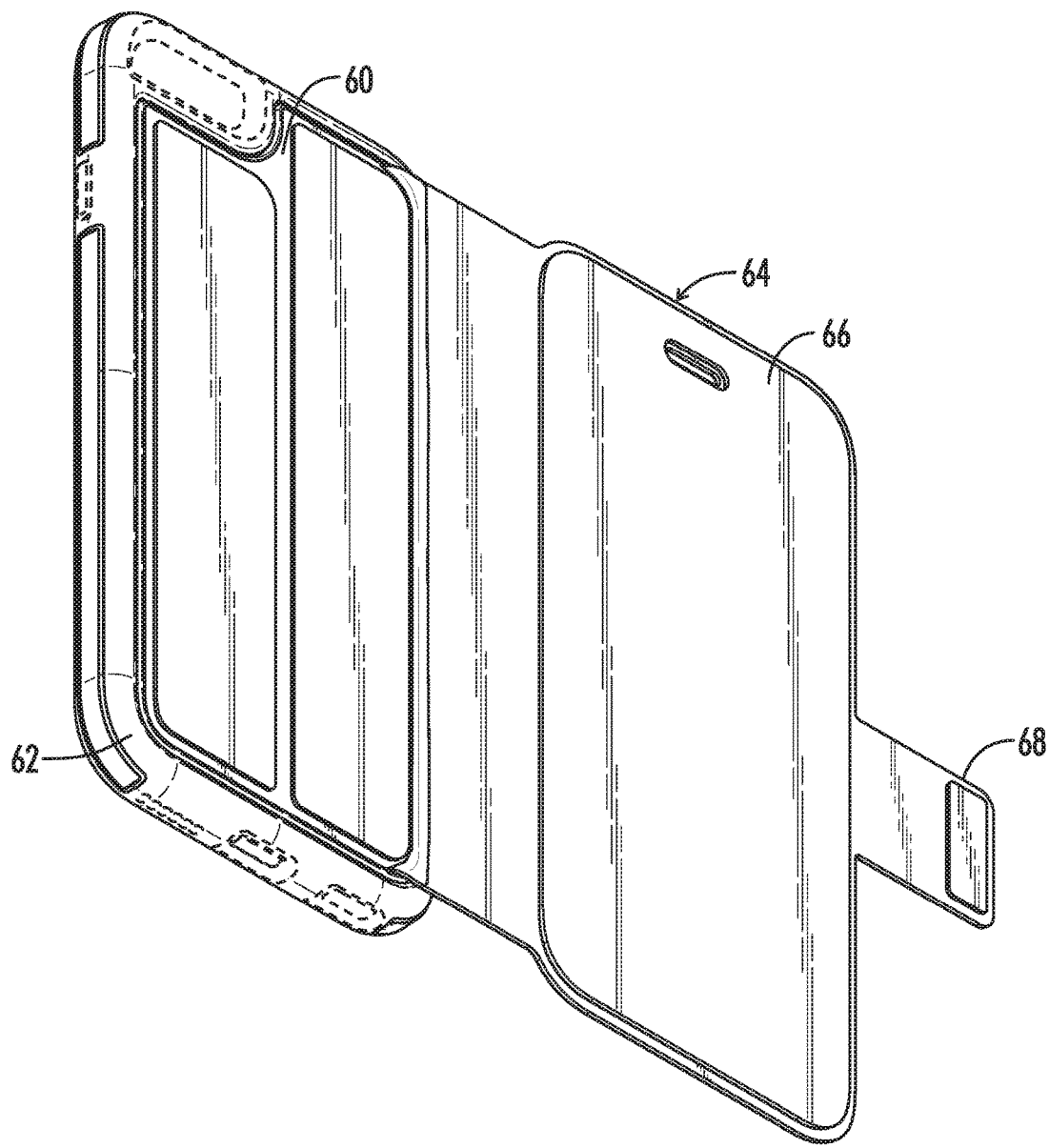
FIG. 7 is a drawing of an embodiment of the present invention with a wallet style back panel inserted into the back of the main case assembly.
Figure 8:
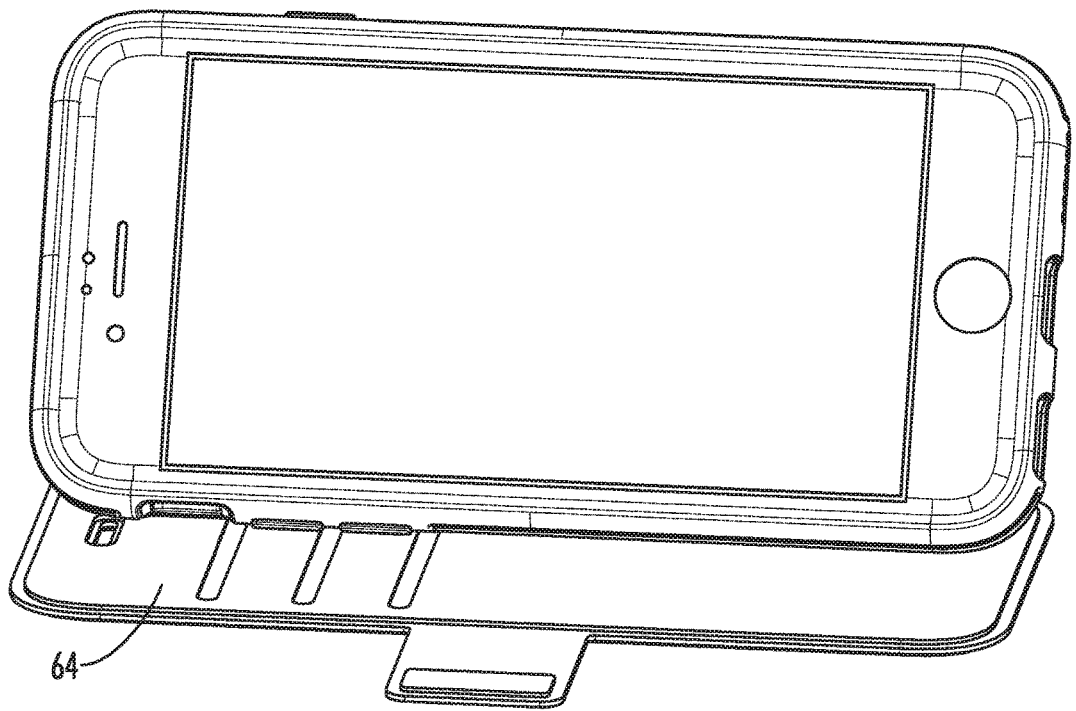
FIG. 8 shows that a wallet portion of the wallet style back panel of FIG. 7 can be folded back to form a stand.

Referring now to FIG. 7, a drawing of an embodiment of the present invention with a wallet style back panel insert 60 inserted into the main case assembly 62 is shown. The wallet style back panel insert 60 includes a fold open wallet portion 64 that functions like a standard fold open wallet with a pocket 66 and a latch 68, which may be magnetic, that holds the wallet closed when folded. The wallet portion 64 can also be folded back to form a stand for the device as shown in FIG. 8.

Although there have been described particular embodiments of the present invention of a new and useful Customizable Device Case, it is not intended that such references be construed as limitations upon the scope of this invention except as set forth in the following claims.

What is claimed is:

1. A protective case for a portable electronic device, the protective case comprising:
   a bumper having a left side wall, a right side wall, a top side wall and a bottom side wall and configured to surround a perimeter of the portable electronic device, the bumper comprises a frame component and a bumper component, the frame component and the bumper component are bounded with each other to form a front opening and a rear opening of the bumper; and
   a back panel configured to be removably inserted into the rear opening of the bumper, wherein the back panel further comprises a lip and locking tabs positioned around an outer perimeter of the back panel that are configured to mate with corresponding surface and cavities positioned around the inner edge of the rear opening of the bumper, wherein the back panel further comprises a stand for the protective case, and wherein the stand further comprises a pair of sloped edges on a foot of the stand that allow the stand to support the protective case in either a horizontal or vertical position.

2. The protective case of claim 1, wherein the back panel further comprises a pocket adapted to hold payment cards.

3. The protective case of claim 2, wherein the back panel further comprises a protrusion in the pocket that applies pressure to any payment cards placed in the pocket.

4. The protective case of claim 1, wherein the back panel further comprises a mirrored surface.

5. The protective case of claim 1, wherein the back panel further comprises a recess adapted for fabric adhesion.

6. The protective case of claim 1, wherein the back panel further comprises a folding style wallet.

7. The protective case of claim 6, wherein the folding style wallet further functions as a device stand.

8. The protective case of claim 1, wherein the portable electronic device can be positioned and held in the bumper by inserting the portable electronic device into the front opening such that edges of the bumper component stretch over the portable electronic device and secure the device in the bumper.

9. The protective case of claim 1, wherein the frame component is made of plastic, and wherein the bumper component is made of rubber.

10. A protective case for a portable electronic device, the protective case comprising:
    a bumper having a front opening and a rear opening and being defined by internal and external surfaces, the internal surface of the bumper is configured to reversibly attach to the perimeter of the portable electronic device; and a back panel configured to be removably attached to the internal surface of the bumper and configured to cover the rear opening of the bumper when attached thereto, wherein the back panel further comprises one or more locking tabs, each of the one or more locking tabs is configured to mate with a corresponding cavity positioned within the internal surface of the bumper, wherein the back panel further comprises a folding style wallet.

11. The protective case of claim 10, wherein the back panel further comprises a stand for the protective case.

12. The protective case of claim 10, wherein the back panel further comprises a pocket adapted to hold payment cards.

13. A protective case system for a portable electronic device, the protective case system comprising:

a bumper having a front opening and a rear opening and being defined by internal and external surfaces, the internal surface of the bumper is configured to reversibly attach to the perimeter of the portable electronic device; and an assortment of different back panels, each of the back panels can be removably inserted into the rear opening of the bumper to alter the appearance or function of the protective case, wherein one of the assortment of different back panels comprises a folding style wallet.

14. The protective case system of claim 13, wherein each of the back panels further comprises a lip and locking tabs positioned around an outer perimeter of the back panel that are configured to mate with corresponding surface and cavities positioned around the inner edge of the rear opening of the bumper.

15. The protective case system of claim 13, wherein one of the assortment of different back panels comprises a stand for the protective case.

16. The protective case system of claim 13, wherein one of the assortment of different back panels comprises a pocket adapted to hold payment cards.

* * * * *